United States Patent [19]

Fukano et al.

[11] Patent Number: 4,649,748

[45] Date of Patent: * Mar. 17, 1987

[54] ACCELEROMETER

[75] Inventors: Michio Fukano, Ohtahara; Takeshi Hojo, Kuroiso, both of Japan

[73] Assignee: Kabushikikaisha Tokyo Keiki, Tokyo, Japan

[*] Notice: The portion of the term of this patent subsequent to Apr. 23, 2002 has been disclaimed.

[21] Appl. No.: 716,500

[22] Filed: Mar. 27, 1985

[30] Foreign Application Priority Data

Mar. 30, 1984 [JP] Japan ................................ 59-64259
Mar. 30, 1984 [JP] Japan ................................ 59-64260
Nov. 14, 1984 [JP] Japan ........................ 59-172538[U]
Nov. 14, 1984 [JP] Japan ........................ 59-172539[U]
Nov. 14, 1984 [JP] Japan ........................ 59-172540[U]

[51] Int. Cl.4 ............................................. G01P 15/13
[52] U.S. Cl. .................. 73/517 B; 73/517 R; 73/653
[58] Field of Search ............... 73/517 B, 517 R, 653, 73/655

[56] References Cited

U.S. PATENT DOCUMENTS

| 3,295,378 | 1/1967 | Hirtreiter | 73/517 B |
| 3,798,454 | 3/1974 | Weiss | 73/517 R X |
| 3,897,690 | 8/1975 | Hanson | 73/517 B |
| 4,512,193 | 4/1985 | Fukano | 73/517 B |
| 4,592,235 | 6/1986 | Fink | 73/517 R |

FOREIGN PATENT DOCUMENTS 0008557 1/1981 Japan ................................ 73/517 R Primary Examiner—Stephen A. Kreitman
Assistant Examiner—Scott M. Oldham
Attorney, Agent, or Firm—Hill, Van Santen, Steadman & Simpson

[57] ABSTRACT

An accelerometer is disclosed, which includes a flexible hinge, a base table fixed with one end of the flexible hinge, a pendulum fixed to the other end of said flexible hinge, torquers for producing a torque proportional to acceleration applied from the base table to the pendulum and a displacement detecting apparatus for electrically detecting a relative displacement between the fixed portion of the base table and the pendulum, wherein the base table is formed of first and second frames, the first frame is provided with an engagement portion for engaging with the second frame, a fixed portion for the flexible hinge, a fixed portion for the displacement detecting apparatus. In this case, the first frame is provided at its outer peripheral portion with an attaching flange portion and, one plane of the flange portion is used as an attaching reference plane for attaching the accelerometer to a body the acceleration of which is to be measured.

6 Claims, 17 Drawing Figures

ACCELEROMETER

BACKGROUND OF THE INVENTION

1. Field of the Invention

This invention relates generally to accelerometers and more particularly to a servo accelerometer.

2. Description of the Prior Art

The outline of a prior art accelerometer which was previously proposed by the present applicant (disclosed in Japanese patent application No. 188924/1981) will be described with reference to FIGS. 1 and 2.

Figure 1:
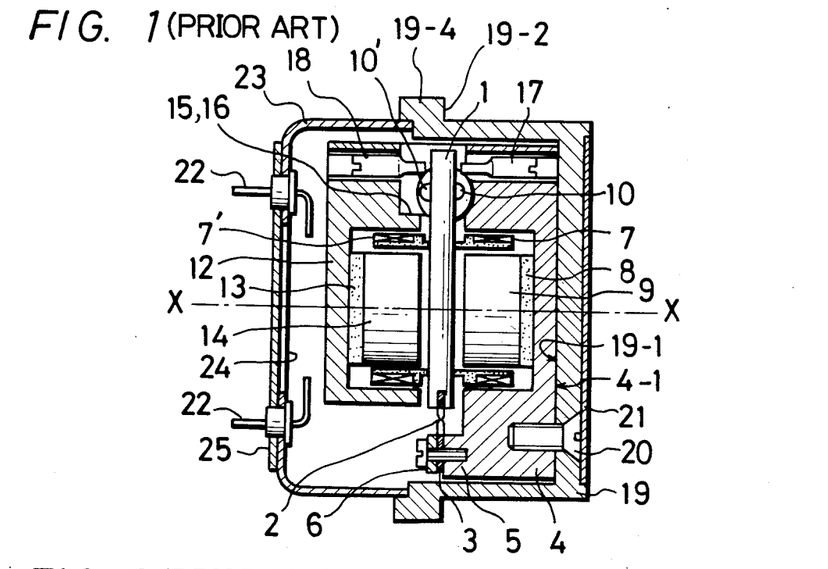
FIGS. 1 and 2 are respectively a longitudinal cross-sectional view and a partially cut-out plan cross-sectional view each illustrating an example of the prior art accelerometer.
Figure 2:
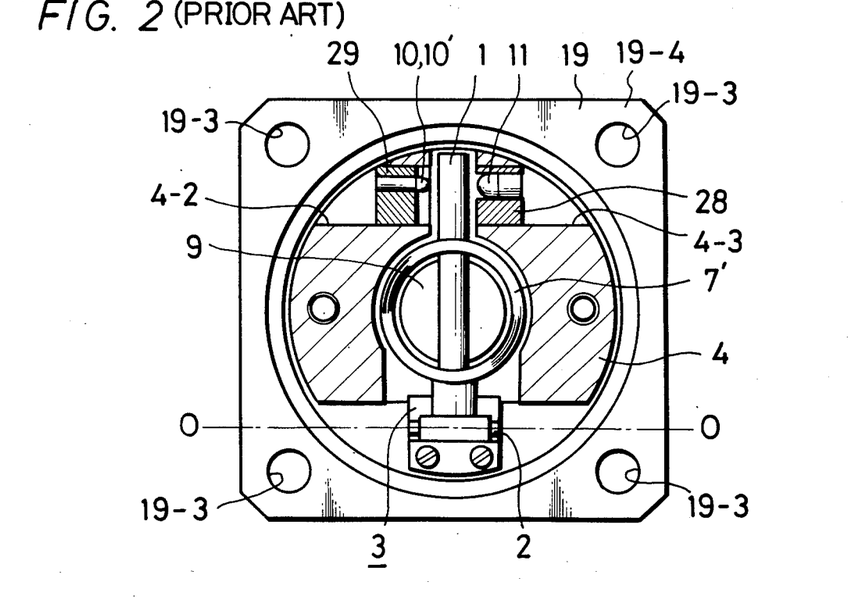

FIG. 1 is a cross-sectional view of such previously proposed accelerometer and FIG. 2 is a partially cut-out plan cross-sectional view thereof.

In FIGS. 1 and 2, reference numeral 1 generally designates a pendulum of rod-shape for detecting acceleration and which is supported by a flexible joint, or hinge 3 having a thin portion 2, namely, a flexible portion. This pendulum 1 can rotate around the thin portion 2 of the hinge 3 only in the X—X direction which is in parallel to the sheet of drawing of FIG. 1. One end of the hinge 3 is positively fixed to a hinge mounting base portion 5 of a first base table or frame 4 through a hinge support plate 6 by, for example, a screw and so on. A pair of torquer coils 7 and 7' of cylindrical shape are attached to the pendulum 1 in the direction perpendicular to the rotation axis or O—O axis of the thin portion 2 of the hinge 3. A disk-shaped permanent magnet 8 and a circular columnar-shaped pole piece 9 are respectively attached to the first frame 4 by, for example, a bonding agent. One torquer coil 7 is within first frame 4. Since the first frame 4 is made of soft iron material of electromagnetic property, this first frame 4 forms a magnetic circuit with the permanent magnet 8 between the first frame 4 and the pole piece 9 and hence serves as a yoke (return path). The permanent magnet 8, the pole piece 9 and the first frame 4 constitute one torquer together with the torquer coil 7. Further, to the first frame 4 there is attached a displacement detecting device which consists of two light receiving elements 10 and 10' and a light emission element 11 so as to detect the displacement of the pendulum 1.

On the other hand, a second base table or frame 12 is made of soft iron material of electromagnetic property similarly to the first frame 4. A permanent magnet 13 and a pole piece 14 are respectively attached to this second frame 12 by a bonding agent. The other torquer coil 7' but being accommodated therein. This second frame 12 forms a magnetic circuit between the permanent magnet 13 and the pole piece 14 and hence serves as a yoke. Then, an engaging portion 16 of the second frame 12 is inserted into an engaging portion 15 of the first frame 4, whereby to fasten the first and second frames 4 and 12 integrally together.

The first frame 4 and the second frame 12 are respectively provided with stoppers 17 and 18 each of which limits the operation range of the pendulum 1. In this case, it is possible to freely adjust the limited operation range of the pendulum 1 by rotatably moving the stoppers 17 and 18, respectively by a screw driver.

The above-described component parts are already able to function as the accelerometer. These component parts are respectively fixed to a casing or housing 19 by a plurality of screws 20 are fastened integral with the housing 19. Then, a lid 21 serving as a characteristic name plate is bonded to the housing 19 to thereby make it possible to maintain the inside of the housing 19 air tight.

Outside terminals 22 such as a lead wire (not shown) and so on for deriving an electrical signal from the light receiving elements 10 and 10' or the like which form the displacement detector and for supplying a feedback current to the torquer coils 7 and 7' are respectively bonded to a terminal casing 23 in an air tight manner and the terminal casing 23 is bonded in an air tight manner to the housing 19 such that one ends of the outside terminals 22 are disposed within the housing 19. Through a central opening 24 of the terminal casing 23, the interconnection of an electrical system of apparatus disposed within the housing 19 and so on are carried out. Then, while evacuating the inside of the housing 19 to vacuum or while filling it with an inert gas (for example, helium gas) or the like, a lid 25 is bonded to the central opening 24 to thereby maintain the inside of the housing 19 air tight. Thus, the parts of the accelerometer therein can be prevented from deteriorating in quality and thence the efficiency of the accelerometer can be held stable for a long time of period.

In the accelerometer arranged as mentioned above, if acceleration acts in the direction of the central axis X—X of the housing 19, the pendulum 1 is displaced a little around the thin portion 2 of the hinge 3, and the light which is emitted from the light emission element 11 is shielded or divided by the pendulum 1 so that the light incident on the light receiving elements 10 and 10' of the displacement detector varies and thus an electrical differential signal corresponding to such displacement is derived from the elements 10 and 10'. Then, a current proportional to this electrical signal is fed back to the torquer coils 7 and 7', by which the pendulum 1 is restored so as to reduce the electrical signal outputs from the light receiving elements 10 and 10' to zero. Since this electrical signal, or the restricting current is proportional to the acceleration, it is possible to detect the input acceleration by measuring this restricting current.

In FIG. 2, reference numerals 19-3 designate apertures formed through a flange-shaped portion 19-4 of the housing 19 which is used to mount this accelerometer on an object whose acceleration is to be measured.

In the above-described accelerometer, however, the first frame 4 assembled to be operable as the accelerometer is accommodated in the cylindrical-shaped housing 19 such that a bottom surface 19-1 of the housing 19 is in contact with a lower surface 4-1 of the first frame 4 and then the first frame 4 and the housing 19 are fixed to each other with a plurality of screws 20. Thereafter, the whole of the accelerometer is mounted on the measured object with a mount reference plane 19-2 beneath the flange-shaped portion 19-4 of the cylindrical-shaped housing 19. Accordingly, even if the accelerometer elements accommodated within the first frame 4 are adjusted precisely, when the first frame 4 is assembled into the housing 19 such that there is incorrect parallelism or flatness between the lower surface 4-1 of the first frame 4 and the mount reference plane 19-2, this inaccurate parallelism or flatness becomes a bias error which varies a zero point. Further, the tightness of the plurality of screws 20 also causes the bias error and furthermore, and the bias error is easily affected by the temperature change.

Figure 3A:
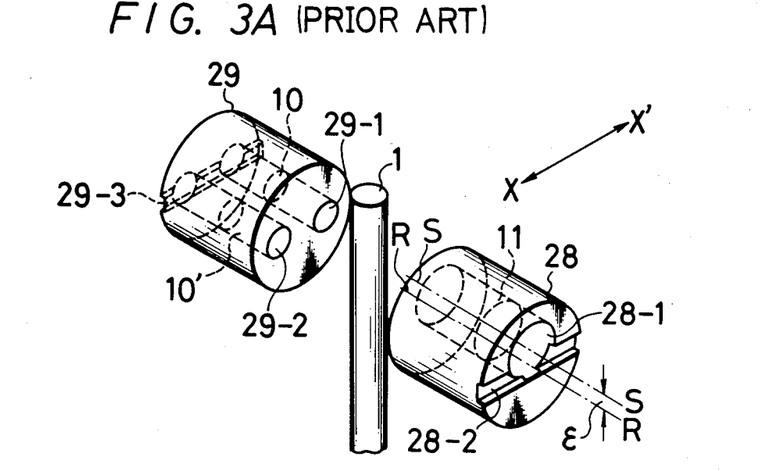
FIG. 3A is an enlarged perspective view illustrating an example of a displacement detecting apparatus used in the prior art accelerometer of FIGS. 1 and 2.

FIG. 3A is an enlarged perspective view of the displacement detecting apparatus used in the prior art accelerometer shown in FIGS. 1 and 2.

Referring to FIG. 3A, a lamp holder 28 of columnar shape which holds the light emission element 11 is inserted into and then fixed within an opening 4-3 formed through the first frame 4 in FIGS. 1 and 2. Reference letter R—R designates the central axis of the lamp holder 28, while a central axis of an opening 28-1 provided through the lamp holder 28 into which the light emission element 11 is inserted or an optical axis S—S of the light emission element 11 is made parallel to the central axis R—R of the lamp holder 28 but displaced upward by $\epsilon$ in this example. Accordingly, if the lamp holder 28 accommodating therein the light emission element 11 is rotated around the R—R axis by using a slit-like groove 28-2 formed on the lamp holder 28, the optical axis S—S of the light emission element 11 can be slightly displaced in the X—X' direction in FIG. 3A, or in the moving direction of the pendulum 1 perpendicular to the axis of the pendulum 1.

Two light receiving elements 10 and 10' are respectively inserted into and fixed in openings 29-1 and 29-2 which are respectively formed through a columnar holder 29 and spaced apart from each other in the X—X' direction. Thereafter, the holder 29 is inserted into and then fixed to the opening 4-2 of the first frame 4. Accordingly, the light emission element 11 and the light receiving elements 10, 10' are opposed to each other across the free end portion serving as the light shielding portion of the pendulum 1. Reference numeral 29-3 designates a slit-like groove formed on the columnar holder 29 similar to the groove 28-2.

Figure 3B:
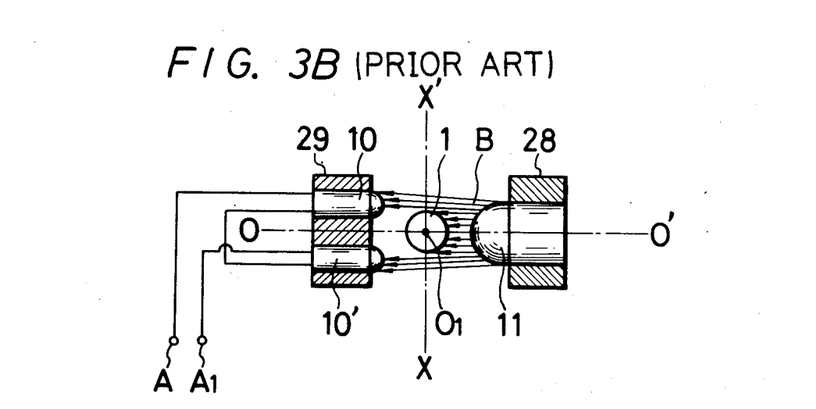
FIGS. 3B and 3C are respectively diagrams useful for explaining the operation of the displacement detecting apparatus of the prior art.

FIG. 3B illustrates the relationship among the light emission element 11, the light receiving elements 10, 10' and the pendulum 1. As shown in FIG. 3B, when the center $O_1$ of the pendulum 1 is placed at the position coincident with a center axis O—O' which connects the optical axis of the light emission element 11 and the center of the optical axes of the light receiving elements 10 and 10', a bundle of light or light flux B emitted from the light emission element 11 is equally divided by the free end portion of the pendulum 1, which free end portion serves as the light shielding portion. As a result, substantially half of the surfaces which are smaller than the whole light receiving surfaces of the two light receiving elements 10 and 10' is equally irradiated with the divided light flux so that no voltage or zero voltage appears across differential output terminals A and $A_1$ which are respectively led out from the light receiving elements 10 and 10'. In other words, FIG. 3B illustrates the state where the pendulum 1 is at its zero position.

However, when, for example, acceleration acts on the pendulum 1 to displace the same from the position shown in FIG. 3B in the X direction in the figure, the amount of light irradiating the light receiving element 10 becomes larger than that of the light incident on the light receiving element 10' so that a voltage corresponding to the displacement of the pendulum 1 is produced between the differential output terminals A and $A_1$, and thus this apparatus functions as a displacement detecting apparatus.

Normally the zero position of the pendulum 1 is not always placed on the center axis O—O' of the light emission element 11 and the light receiving elements 10 and 10'. Further, under the condition where no acceleration acts on the pendulum 1, an output voltage is produced between the output terminals A and $A_1$ due to the scattering of the characteristics of the light receiving elements 10 and 10'. Therefore, in the course of adjusting the displacement detecting apparatus, it becomes necessary to reduce the output voltage to zero.

Figure 3C:
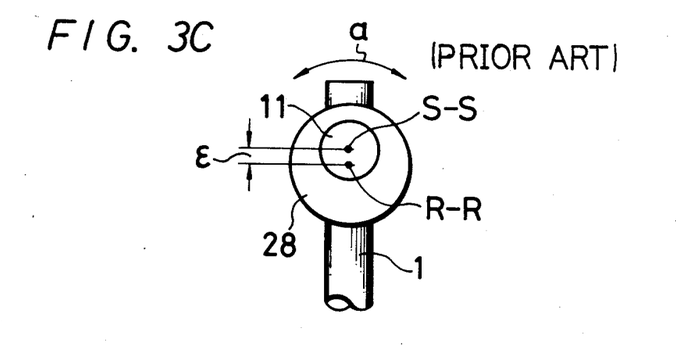

In the prior art accelerometer shown in FIGS. 1 and 2, the lamp holder 28 can be rotated by a small angle as earlier noted, or as shown in FIG. 3C, the lamp holder 28 or the holder 29 can be rotated around the axis R—R in the direction shown by an arrow a to thereby move the light emission element 11 or the light receiving elements 10 and 10' in the right and left directions in correspondence with the zero position of the pendulum 1, and thus the zero position of the displacement detecting apparatus can be adjusted.

In such prior art accelerometer, however, since the movement of the free end portion of the rod-shaped pendulum 1 is detected by using the light emission element 11 and the light receiving elements 10 and 10' which are respectively spaced apart across the pendulum 1 in opposing relation to each other, due to the interposition of the free end portion of the rod-shaped pendulum 1, the distance between the light emission element 11 and the light receiving elements 10, 10' is inevitably made to be a considerable distance. There are thus defects in the prior art displacement detecting apparatus which has low resolution and sensitivity and such displacement detecting apparatus has a large amount of noise. Accordingly, when this prior art apparatus is operated as an accelerometer, it has low resolution and has a large amount of noise.

OBJECTS AND SUMMARY OF THE INVENTION

Accordingly, it is an object of this invention to provide an improved accelerometer.

It is another object of this invention to provide an accelerometer having small size and which is lightweight and which can be manufactured for low cost.

It is still another object of this invention to provide an accelerometer in which the adjustment of a bias error can be easily carried out and which can decrease the bias error.

It is a further object of this invention to provide an accelerometer which is stable and efficiently detects accelerations.

It is a further object of this invention to provide an accelerometer which has excellent vibration-resistant properties and has impulse efficiency.

It is a further object of this invention to provide an accelerometer accommodating therein a displacement detector which can detect a displacement of a pendulum with very high sensitivity and resolution.

It is a still further object of this invention to provide an accelerometer capable of reducing the influence of irregular reflections and which can reduce noise.

It is a still further object of this invention to provide an accelerometer capable of smoothly carrying out a delicate adjustment of a displacement detector used therein and which can reduce the time necessary for adjusting the displacement detecting apparatus.

It is a yet further object of this invention to provide an accelerometer capable of suppressing an inaccurate zero point of a displacement detecting apparatus used therein due to variations and so on and which can afford high accuracy.

According to an aspect of this invention, there is provided an accelerometer comprising:
a flexible hinge;
a base table to which one end of said flexible hinge is fixed;

a pendulum fixed to the other end of said flexible hinge;

torquer means for producing a torque proportional to acceleration applied from a fixed portion of said base table to said pendulum;

a stopper for limiting a displacement of said pendulum;

displacement detecting means including a light emission element and a light receiving element for electrically detecting a relative displacement between said fixed portion of said base table and said pendulum, said base table being formed of first and second frames, said first frame including a fixed portion to which said flexible hinge is fixed, a fixed portion to which said displacement detecting means is fixed and an engagement portion with said second frame, said fixed portion for said flexible hinge and said fixed portion for said displacement detecting means being respectively formed on said first frame;

an attaching flange portion provided along an outer peripheral portion of said first frame; and an attaching reference plane formed on one plane of said flange portion.

These and other objects, features and advantages of the accelerometer according to the present invention will become apparent from the following detailed description of the preferred embodiments taken in conjunction with the accompanying drawings, throughout which like reference numerals designate like elements and parts.

DESCRIPTION OF THE PREFERRED EMBODIMENTS

Figure 4:
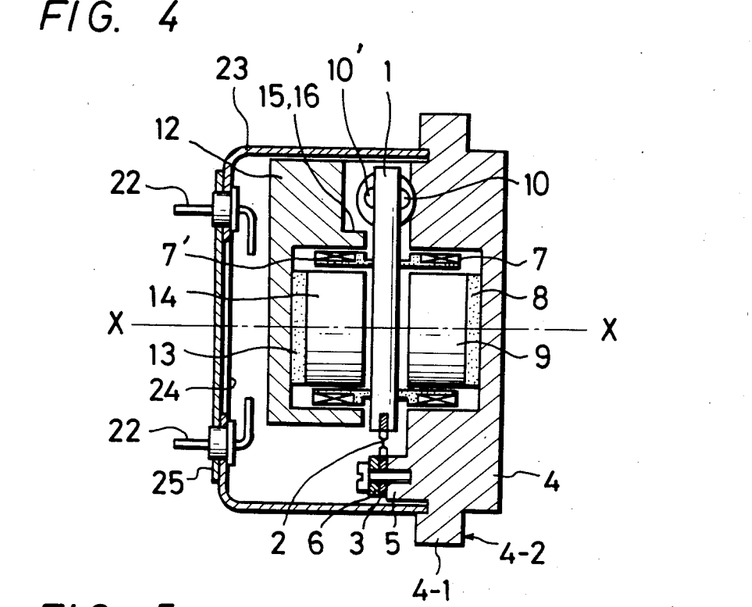
FIGS. 4 and 5 are respectively a longitudinal cross-sectional view and a partially cut-out cross-sectional view each illustrating a first embodiment of the accelerometer according to this invention.
Figure 5:
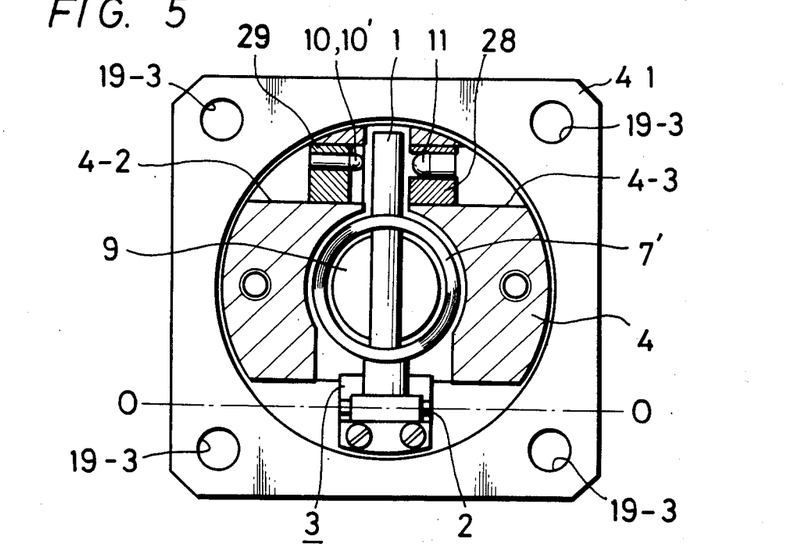

Now, an embodiment of the accelerometer according to this invention will hereinafter be described with reference to FIGS. 4 and 5. FIGS. 4 and 5 are respectively diagrams similar to FIGS. 1 and 2, and in FIGS. 4 and 5, like parts corresponding to those of FIGS. 1 and 2 are marked with the same references and will not be described in detail.

The first embodiment of the present invention shown in FIGS. 4 and 5 differs from the prior art accelerometer shown in FIGS. 1 and 2 as follows. That is, in this embodiment shown in FIGS. 4 and 5, the cylindrical-shaped housing 19 having the flange-shaped portion 19-4 and the mounting reference plane 19-2 in the prior art accelerometer shown in FIGS. 1 and 2 is removed and instead, a part of the outer periphery of the first frame 4 is formed as a flange-shaped portion 4-1 and the lower surface of the flange-shaped portion 4-1 is used as a mounting reference plane 4-2.

As shown in FIGS. 4 and 5, in this embodiment, the first frame 4 is formed as a block shape such that the outer cylindrical portion of the housing 19 with the flange-shaped portion 19-4 as shown in FIGS. 1 and 2 may be fixed integrally to the first frame 4, particularly the outer peripheral portion of the first frame 4. Therefore, in this embodiment, the terminal casing 23 is directly fixed to the first frame 4 at its portion near the flange-shaped portion 4-1 (this flange-shaped portion 4-1 corresponds to the flange-shaped portion 19-4 of FIGS. 1 and 2). The under surface of this flange-shaped portion 4-1 is used as the mounting reference plane 4-2 as set forth above.

Other arrangements and operations of the accelerometer of this embodiment are substantially the same as those of the prior art accelerometer of FIGS. 1 and 2.

Also in this embodiment, similarly to the example of FIG. 1, the stoppers 17 and 18 are provided though not shown in FIG. 4 for simplicity. Further, in this embodiment the mounting apertures 19-3 are respectively formed through the flange-shaped portion 4-1.

According to the accelerometer of this embodiment as described above, the following effects can be achieved.

(1) The accelerometer of this embodiment it is not required to provide the cylindrical housing 19 which has the mounting reference plane 19-2 and the bottom surface 19-1 which require accurate flatness and parallelism provided in the example of the prior art accelerometer of FIGS. 1 and 2. Thus, the accelerometer of this embodiment can be made small in size, light in weight and has a low manufacturing cost.

(2) Since the mounting reference plane 4-2 is directly formed on the first frame 4, the reference planes upon adjusting and completion of the displacement detecting apparatus become the same so that it is not necessary to adjust the bias error once again and thus the bias error can be decreased.

(3) Since the cylindrical housing 19 is not used in this invention, no bias error fluctuation is caused by fastening the housing 19 to the first frame 4 by screws unlike the prior art. Further, the inaccuracy of the reference plane due to the change of temperature can be decreased so that the accelerometer of this embodiment can be made to have stable efficiency.

Figure 6:
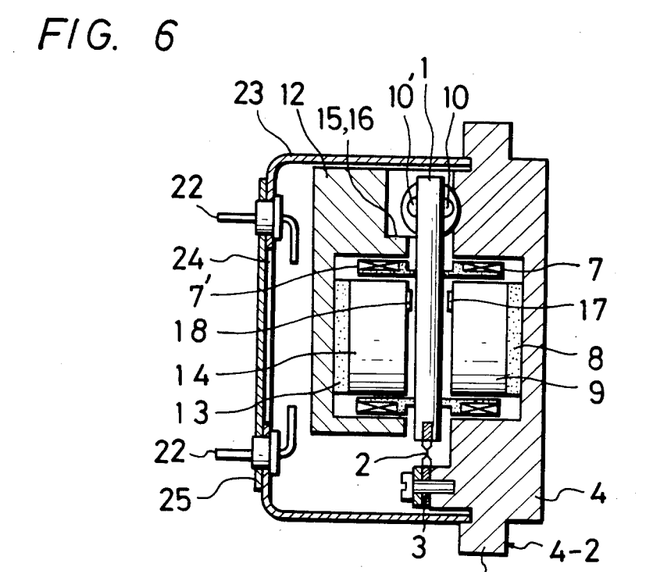
FIGS. 6 and 7 are respectively a longitudinal cross-sectional view and a partially cut-out plan cross-sectional view each illustrating a second embodiment of the accelerometer according to this invention.

Next, a second embodiment of the accelerometer according to this invention will be described with reference to FIGS. 6 to 8. FIG. 6 is a longitudinal cross-sectional view illustrating the second embodiment of the accelerometer according to this invention. In FIG. 6, like parts corresponding to those of FIGS. 1 and 2 are marked with the same references and will not be described.

The second embodiment of FIGS. 6 to 8 differs from the first embodiment of FIGS. 4 and 5 as follows. That is, in the second embodiment, the stoppers 17 and 18 are each formed as disk-shaped portions and the pendulum 1, the hinge 3 and so on are respectively designed such that these stoppers 17 and 18 are respectively fixed to the pole pieces 9 and 14 on their inner end surfaces corresponding to a center of percussion of the pendulum 1, wherein the thin portion 2 of the hinge 3 coincides with the center of percussion of the pendulum 1.

Figure 7:
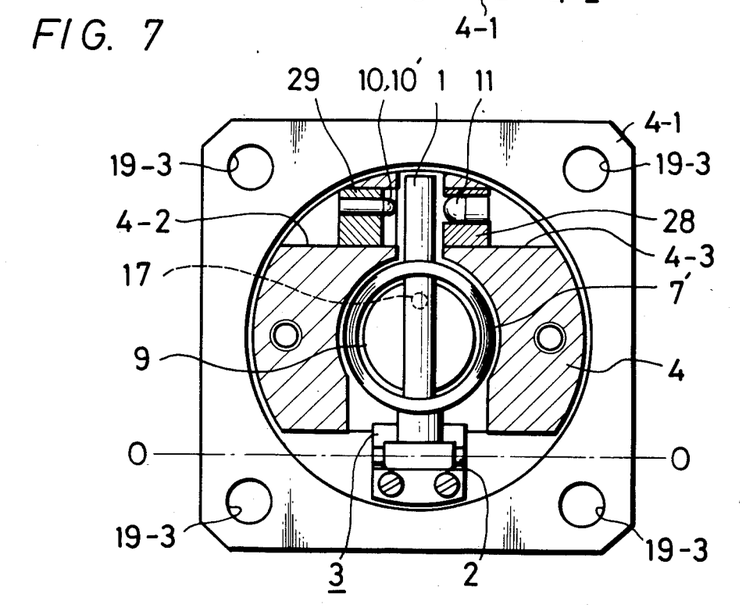
Figure 8:
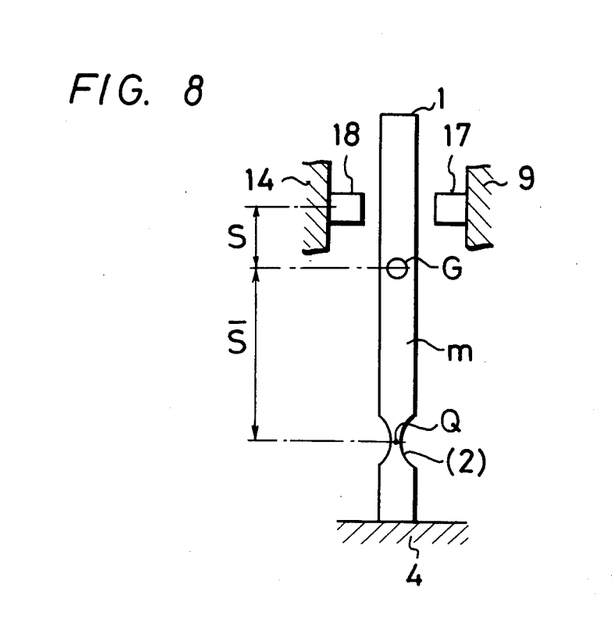
FIG. 8 is a schematic diagram useful for explaining the operation of the second embodiment.

Since other arrangements of the second embodiment shown in FIGS. 6 to 8 are substantially the same as those of the first embodiment of FIGS. 4 and 5, they are marked with the same references and thence will not be described in detail.

FIG. 7 is a partially cut-out plan cross-sectional view of FIG. 6.

Next, the operation of the second embodiment of the accelerometer according to this invention will be described with reference to FIG. 8 which schematically shows a main part of the second embodiment. In FIG. 8, when vibration or impulse acceleration is applied to the first frame 4 which is the base table of the accelerometer, although the pendulum 1 is rotated around a center point Q of the thin portion 2 of the hinge 3, the displacement of the pendulum 1 is limited by the stoppers 17 and 18. If, now, the mass of the pendulum 1 is taken as m, the center of gravity thereof is taken as G, the inertia radius of the pendulum 1 around the center of gravity G is taken as k, the distance between the center of gravity G of the pendulum 1 and the center point Q of the thin portion 2 of the hinge 3 is taken as $\bar{S}$ and the distance between the center of gravity G and the stoppers 17, 18 is taken as S, a relation thereamong is established by the following equation $$S = k^2/\bar{S} \quad (1)$$

If the position of the stoppers 17 and 18 is determined by the values which can satisfy the Eq. (1), when the pendulum 1 collides with the stoppers 17 and 18, the thin portion 2 of the hinge 3 can be completely prevented from having an applied load.

In other words, in the second embodiment of the present invention, if, on the basis of the above operation, the thin portion 2 of the hinge 3 is selected so that the so-called center of rotation for the pendulum 1 and the stoppers 17 and 18 coincide with the percussion point of the pendulum 1, the pendulum 1 is limited in displacement and the stress generated in the thin portion 2 of the hinge 3 is suppressed.

As described above, according to the second embodiment of this invention, the following effects can be enumerated.

(1) Since the stoppers 17 and 18 are formed to be disk shaped and the stoppers 17 and 18 are disposed at the above-mentioned positions on the inner end surfaces of the pole pieces 9 and 14, the displacement of the pendulum 1 can be limited at the position of the percussion point in the longitudinal direction of the pendulum 1. Accordingly, when the accelerometer is not in operation, all of the velocity or kinetic energy of the pendulum 1 caused by vibration and impulse can be dissipated by the collision of the pendulum 1 with the stoppers 17 and 18 and the thin portion 2 of the hinge 3 becomes the center of rotation for the pendulum 1 so that no load is applied to the thin portion 2 of the hinge 3. More particularly, deformation and the like are not caused in the thin portion 2 of the hinge 3 by the vibration and impulse so that it is possible to obtain a accelerometer which has excellent vibration-resistant properties and has high impulse efficiency.

Figure 9:
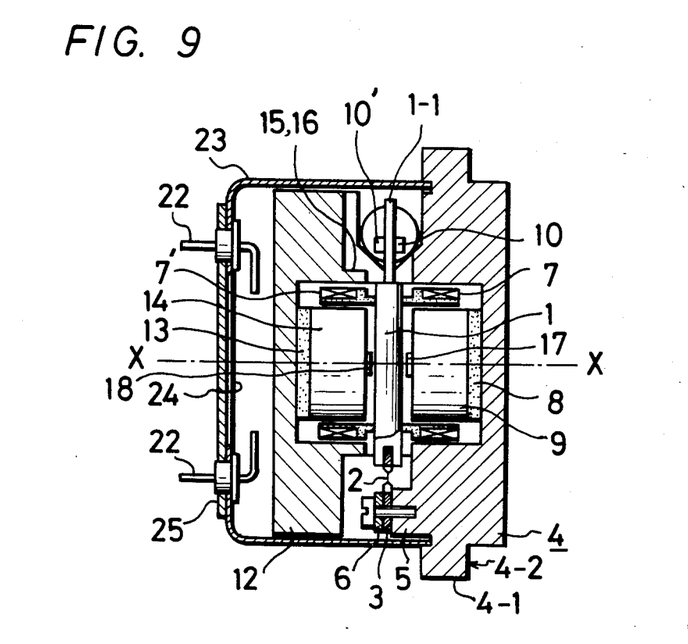
FIGS. 9 and 10 are respectively a longitudinal cross-sectional view and a plan cross-sectional view each illustrating a third embodiment of the accelerometer according to this invention.
Figure 10:
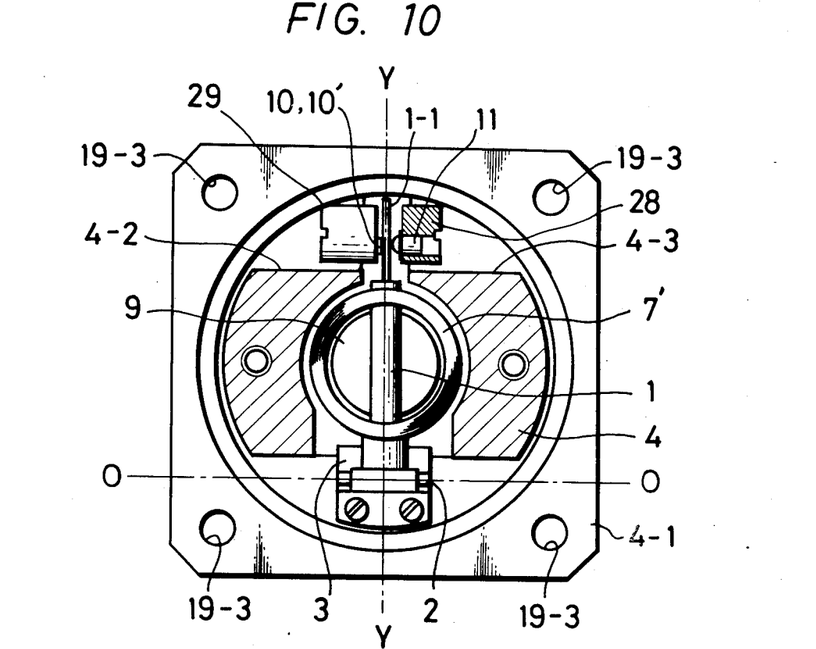
Figure 11:
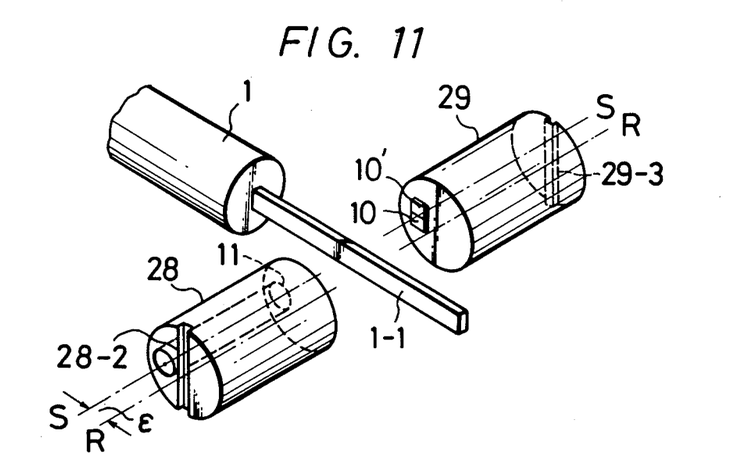
FIG. 11 is an enlarged perspective view illustrating a displacement detecting apparatus used in the accelerometer of FIGS. 9 and 10.

Referring to FIGS. 9 to 11, a third embodiment of the accelerometer according to this invention will be described hereinafter. FIGS. 9 and 10 are respectively a longitudinal cross-sectional view and a partially cut-out plan cross-sectional view each illustrating the third embodiment of the accelerometer according to this invention. In FIGS. 9 and 10, like parts corresponding to those of FIGS. 4 and 5 are marked with the same references and will not be described in detail.

The third embodiment shown in FIGS. 9 and 10 mainly differs from the first embodiment of FIGS. 4 and 5 as follows.

That is, in the third embodiment of the invention shown in FIGS. 9 and 10, the tip end portion 1-1 of the rod-shaped pendulum 1 is formed as a rectangular thin plate-shaped portion with a plane parallel to the central axis X—X of the first base table 4 and of which the thickness in the direction perpendicular to the central axis X—X is made thin and the space between the light emission element 11 and the light receiving elements 10, 10' which are located at both sides of the rectangular thin plate-shaped portion 1-1 is selected to be very small or narrow. In other words, the light emission element 11 and the light receiving elements 10, 10' are respectively disposed in the vicinity of both side surfaces of the rectangular thin plate-shaped portion 1-1.

FIG. 11 is an enlarged perspective view illustrating a displacement detecting apparatus which is a main part of the third embodiment of this invention. In FIG. 11, to facilitate the understanding of the positional relationship of the respective parts, the light emission element 11 and the light receiving elements 10, 10' are largely spaced apart a large distance from the rectangular thin plate-shaped portion 1-1. While in FIGS. 9, 10 and 11, the light receiving elements 10 and 10' are formed as the flat plate-shaped elements, that they may also be columnar shaped as shown in, for example, FIGS. 4 and 5.

Since the acceleration detecting operation of the accelerometer of the third embodiment of FIGS. 9 to 11 is substantially the same as those of the first and second embodiments of this invention, it will not be described.

As described above, the third embodiment can achieve the following effects.

(1) Since the tip end portion 1-1 of the rod-shaped pendulum 1 is formed as a rectangular thin plate-shaped portion and the light emission element 11 and the light receiving elements 10, 10' are disposed in close relationship to each other across the above-described rectangular thin plate-shaped portion 1-1 which is the movable portion, the displacement detecting apparatus can detect the displacement of the pendulum 1 with very high sensitivity and resolution. As a result, it is possible to obtain an accelerometer which has high efficiency.

(2) Since the light emission element 11 and the light receiving elements 10, 10' are respectively disposed in very close relationship to each other, it is possible to decrease the influence of irregular reflections caused by light emitted from the light emission element 11 which is irregularly reflected on other members of the apparatus and then arrives at the light receiving elements 10 and 10' and thus the noise of the accelerometer is reduced.

Figure 12:
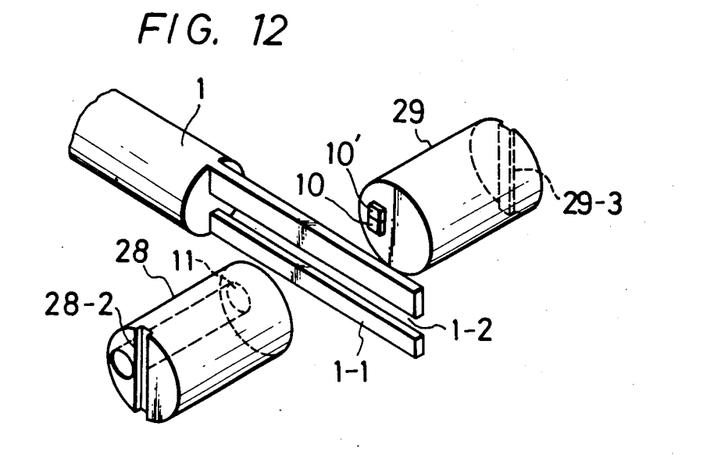
FIG. 12 is an enlarged perspective view of a fourth embodiment of the accelerometer according to this invention, highlighting the displacement detecting apparatus used therein.

Referring to FIG. 12, a fourth embodiment of the accelerometer according to this invention will be described hereinafter. FIG. 12 is an enlarged perspective view similar to FIG. 11, illustrating a main part, or the displacement detecting apparatus of the accelerometer according to this invention and the structure to which the fourth embodiment is applied is substantially same as that shown in FIGS. 9 and 10. In FIG. 12, like parts corresponding to those of FIG. 11 are marked with the same references and will not be described in detail.

The fourth embodiment of FIG. 12 mainly differs from the third embodiment of FIGS. 9 to 11 as follows. That is, in the fourth embodiment, in the tip end portion or the rectangular thin plate-shaped portion 1-1 of the rod-shaped pendulum 1 with the plane parallel to the central axis X—X of the first base table 4 (refer to FIGS. 9 and 10) and which is thin in thickness in the direction perpendicular to the central axis X—X, there is provided a slit 1-2 which extends in the axis Y—Y direction of the pendulum 1 (refer to FIG. 10). Then, the length or the distance between the light emission element 11 and the light receiving elements 10, 10' across the rectangular thin plate-shaped portion 1-1, particularly the slit 1-2 is selected to be very short (refer to FIG. 10). In other words, the feature of the fourth embodiment lies in the fact that the light emission element 11 and the light receiving elements 10, 10' are disposed in very close relationship to each other at both side surfaces of the rectangular thin plate-shaped portion 1-1, particularly at both sides of the slit 1-2.

In FIG. 12, similarly to FIG. 11, to easily understand the positional relation of respective parts of the displacement detecting apparatus such as the light emission element 11 and the light receiving elements 10, 10' are spaced apart on either side of the rectangular thin plate-shaped portion 1-1. Further, while in FIG. 12 the light receiving elements 10, 10' are formed as flat plate-shaped elements, they may also be of columnar shaped as shown in, for example, FIGS. 4 and 5.

Since the acceleration detecting operation of the fourth embodiment is substantially the same as the first to third embodiments of this invention, they will not be described.

As described above, the fourth embodiment can achieve the effects which are substantially the same as those of the third embodiment.

Figure 13:
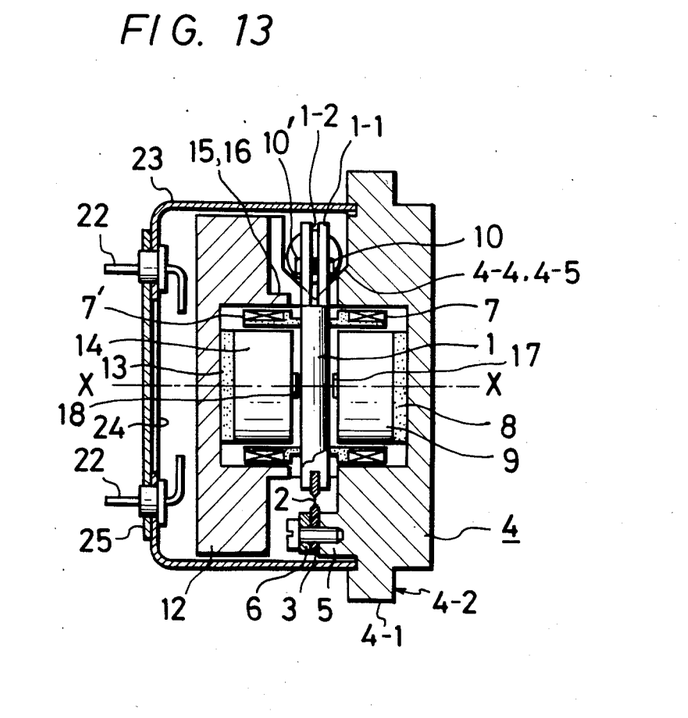
FIGS. 13 and 14 are respectively a longitudinal cross-sectional view and a plan cross-sectional view each illustrating a fifth embodiment of the accelerometer according to this invention.
Figure 14:
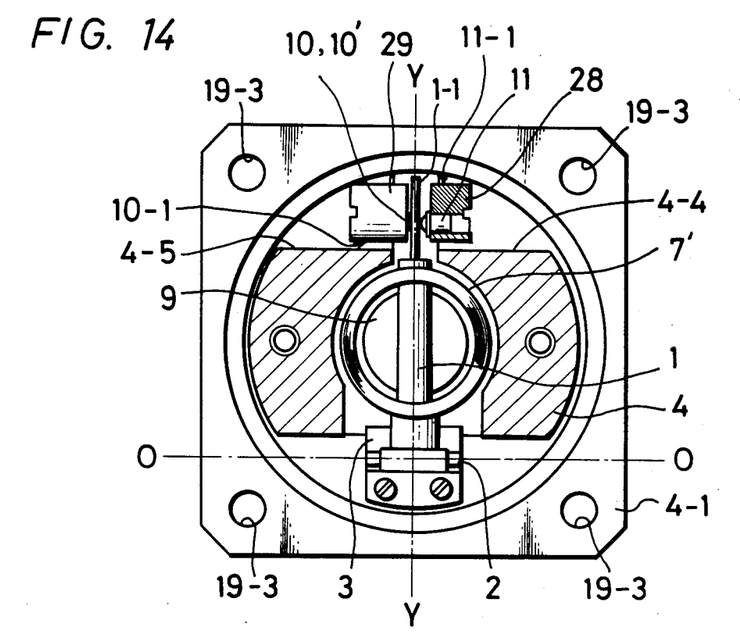
Figure 15:
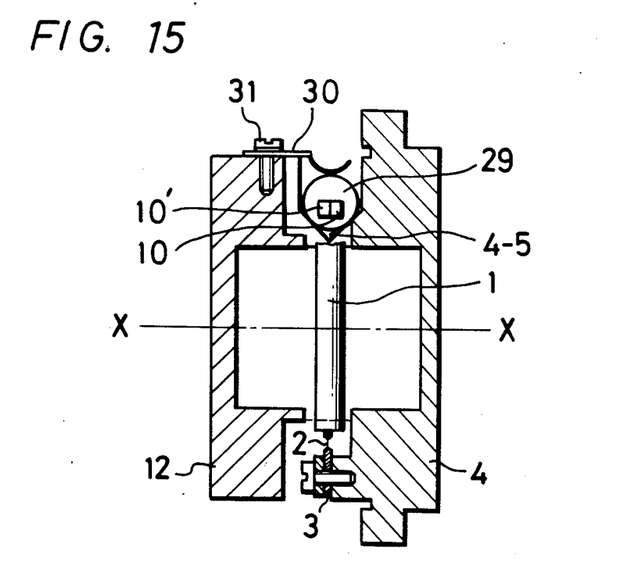
FIG. 15 is a cross-sectional view illustrating a main part of the fifth embodiment of this invention.

Referring to FIGS. 13 to 15, a fifth embodiment of the accelerometer according to this invention will be described hereinafter. FIGS. 13 and 14 are respectively a longitudinal cross-sectional view and a partially cut-out plan cross-sectional view each illustrating the fifth embodiment of the accelerometer according to this invention. In FIGS. 13 to 15, like parts corresponding to those of FIGS. 9 to 11 and FIG. 12 are marked with the same references and will not be described in detail.

The fifth embodiment of FIGS. 13 to 15 differs from the fourth embodiment of FIG. 12 as follows. That is, in the fifth embodiment, the lamp holder 28 and the holder 29 are not respectively inserted into the openings 4-2 and 4-3 (refer to FIG. 7) but instead, V-shaped grooves 4-4 and 4-5 are respectively formed through the first frame 4, so as to support the lamp holder 28 and the holder 29 by contacting cylindrical outer peripheral surfaces 11-1 and 10-1 of the lamp holder 28 and the holder 29 with the grooved surfaces of the V-shaped grooves 4-4 and 4-5, respectively.

FIG. 15 is a cross-sectional view of the fifth embodiment of the accelerometer according to this invention, for explaining the main part thereof, or the part relating to the V-shaped groove 4-5 and the holder 29. Upon adjusting the displacement adjusting apparatus, under the state where the holder 29 or the lamp holder 28 is forced by a leaf spring 30 which has one end is fixed to the second frame 12 on by a lock screw 31, so as to strongly urge its outer peripheral portion opposing the V-shaped groove 4-5 of the holder 29 into the V-shaped groove 4-5, which allows the adjustment of the displacement detecting apparatus to be carried out. After adjustment, it is normal that the lamp holder 28 and the holder 29 are respectively fixed to the V-shaped grooves 4-4 and 4-5 with a bonding agent and the like. In this case, after the bonding, the leaf spring 30 may be removed or left place.

Further, while in FIGS. 13 to 15 the light receiving elements 10 and 10' are respectively formed as the flat plate-shaped elements, they can also be formed as columnar types.

Furthermore, since the acceleration detecting operation of the fifth embodiment shown in FIGS. 13 to 15 is substantially the same as those of the first to fourth embodiments, it will not be described.

As set forth above, according to the fifth embodiment, the following effects can be achieved.

(1) Since the lamp holder 28 and the holder 29 are respectively pressed at their outer peripheral cylindrical surfaces 11-1 and 10-1 against the grooved surfaces of the V-shaped grooves 4-4 and 4-5 formed through the first frame 4 along two lines by the spring force of the leaf spring 30 so that they will not to move, upon adjusting the displacement detecting apparatus, when the lamp holder 28 and the holder 29 are rotated slightly, they are free of lost movement, and delicate or fine adjustments can be carried out smoothly and the time necessary for the adjustment can be reduced considerably. In the prior art between the openings and the holders there are clearances so that the fine adjustment is impossible.

(2) Since the displacement detecting apparatus is assembled under the state that the lamp holder 28 and the holder 29 are completely in contact with the V-shaped grooves 4-4 and 4-5, respectively, the zero point of the displacement detecting apparatus can be prevented from being varied due to variations and the like. Thus, it is possible to obtain the accelerometer of high accuracy.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claims as our invention:

1. Accelerometer comprising:
a flexible hinge;
a base table to which one end of said flexible hinge is fixed;
a pendulum fixed to the other end of said flexible hinge;

torquer means for producing a torque proportional to acceleration applied from a fixed portion of said base table to said pendulum;

a stopper for limiting a displacement of said pendulum;

displacement detecting means including a light emission element and a light receiving element for electrically detecting a relative displacement between said fixed portion of said base table and said pendulum, said base table being formed of first and second frames, said first frame including a fixed portion to which said flexible hinge is fixed, a fixed portion to which said displacement detecting means is fixed and an engagement portion with said second frame, said fixed portion for said flexible hinge and said fixed portion for said displacement detecting means being respectively formed on said first frame;

an attaching flange portion provided along an outer peripheral portion of said first frame; and an attaching reference plane formed on one plane of said flange portion, and said stopper being disposed at a position corresponding to a percussion point of said pendulum and said flexible hinge being positioned to coincide with a center of rotation of said pendulum.

2. Accelerometer as claimed in claim 1, in which a free end of said pendulum is formed to be a rectangular thin plate-shaped portion having a plane parallel to an angular displacement direction of said pendulum and said light emission element and light receiving element are respectively disposed as close as possible across said rectangular thin plate-shaped portion.

3. Accelerometer as claimed in claim 2, in which said rectangular thin plate-shaped portion is provided with a slit which is extended along a central axis of said pendulum and said light emission element and light receiving element are respectively disposed as close as possible across said rectangular thin plate-shaped portion.

4. Accelerometer as claimed in claim 1, in which said light emission element is supported by a first comlumnar holder and said light receiving element is supported by a second columnar holder.

5. Accelerometer as claimed in claim 4, in which a V-shaped groove is formed through said first frame in parallel to an axis of said flexible hinge and said first and second columnar holders are fixed in contact at outer peripheral surfaces thereof with a groove surface of said V-shaped groove.

6. Accelerometer as claimed in claim 4, in which a columnar axis of said first holder is coincident with that of said second columnar holder and an optical axis of said light emission element is coincident with an optical center of said light receiving element, wherein the optical axis of said light emission element is displaced from the columnar axis of said first holder in the longitudinal direction of said pendulum.

* * * * *